(12) United States Patent
Trembacz et al.

(10) Patent No.: US 12,170,668 B2
(45) Date of Patent: Dec. 17, 2024

(54) NETWORK SECURITY PATH IDENTIFICATION AND VALIDATION

(71) Applicant: Salesforce, Inc., San Francisco, CA (US)

(72) Inventors: Michal Trembacz, Wexford (IE); Gianstefano Monni, Nuoro (IT)

(73) Assignee: Salesforce, Inc., San Francisco, CA (US)

( * ) Notice: Subject to any disclaimer, the term of this patent is extended or adjusted under 35 U.S.C. 154(b) by 260 days.

(21) Appl. No.: 17/689,820

(22) Filed: Mar. 8, 2022

(65) Prior Publication Data

US 2023/0291736 A1     Sep. 14, 2023

(51) Int. Cl.
| | | |
|---|---|---|
| H04L 9/40 | (2022.01) | |
| H04L 41/0893 | (2022.01) | |
| H04L 41/12 | (2022.01) | |

(52) U.S. Cl.
CPC ........ *H04L 63/101* (2013.01); *H04L 41/0893* (2013.01); *H04L 41/12* (2013.01); *H04L 63/18* (2013.01); *H04L 63/20* (2013.01)

(58) Field of Classification Search
CPC ....... H04L 63/101; H04L 63/18; H04L 63/20; H04L 41/0893; H04L 41/12
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |

(Continued)

FOREIGN PATENT DOCUMENTS

| | | | | |
|---|---|---|---|---|
| CN | 107078921 A | * | 8/2017 | ........... G06F 16/285 |
| CN | 115004656 A | * | 9/2022 | ........... H04L 41/082 |

(Continued)

*Primary Examiner* — Sarah Su

(74) *Attorney, Agent, or Firm* — Sterne, Kessler, Goldstein & Fox P.L.L.C.

(57) ABSTRACT

Embodiments herein may relate to a technique for identification and verification of compliance with one or more pre-defined security policy sets for a network. Specifically, embodiments may include generation of an access control graph (ACG) that relates to the network. One or more paths of the ACG may be identified, and then compared against the pre-defined security policy sets. Other embodiments may be described or claimed.

21 Claims, 13 Drawing Sheets

(56) References Cited

U.S. PATENT DOCUMENTS

| | | |
|---|---|---|
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,258,313 B1* | 2/2016 | Knappe ............... H04L 63/0236 |
| 11,245,729 B2 | 2/2022 | Monni |
| 11,469,952 B2* | 10/2022 | Kompella ............ H04L 63/101 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |

(56) References Cited

U.S. PATENT DOCUMENTS

| | | |
|---|---|---|
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2015/0161622 A1* | 6/2015 | Hoffmann ............... H04L 63/20 705/318 |
| 2017/0353453 A1* | 12/2017 | Hutchinson ............ H04L 63/10 |
| 2018/0351791 A1* | 12/2018 | Nagarajan ........... H04L 41/0895 |
| 2019/0312881 A1* | 10/2019 | Dasgupta .............. H04L 63/104 |
| 2019/0327271 A1* | 10/2019 | Saxena ..................... G06F 8/38 |
| 2020/0076769 A1* | 3/2020 | Mishra ............... H04L 41/0806 |
| 2020/0136917 A1* | 4/2020 | Kang .................. H04L 61/2571 |
| 2021/0014274 A1* | 1/2021 | Monni ..................... H04L 63/20 |
| 2021/0352107 A1* | 11/2021 | Monni ..................... H04L 63/20 |
| 2022/0159003 A1* | 5/2022 | Butcher ................. H04L 63/101 |
| 2023/0086475 A1* | 3/2023 | Mosko .................... H04L 63/20 726/1 |
| 2023/0179622 A1* | 6/2023 | Underwood ........... H04L 63/20 726/25 |
| 2023/0208882 A1* | 6/2023 | Crabtree ............... G06F 21/577 726/22 |
| 2023/0275908 A1* | 8/2023 | Mace ................... G06F 21/552 726/23 |

FOREIGN PATENT DOCUMENTS

| | | | | |
|---|---|---|---|---|
| CN | 111919418 B | * | 9/2023 | ......... H04L 41/0806 |
| WO | WO-2014153366 A1 | * | 9/2014 | ......... G06F 21/6218 |
| WO | WO-2020046842 A1 | * | 3/2020 | ......... H04L 41/0803 |

* cited by examiner

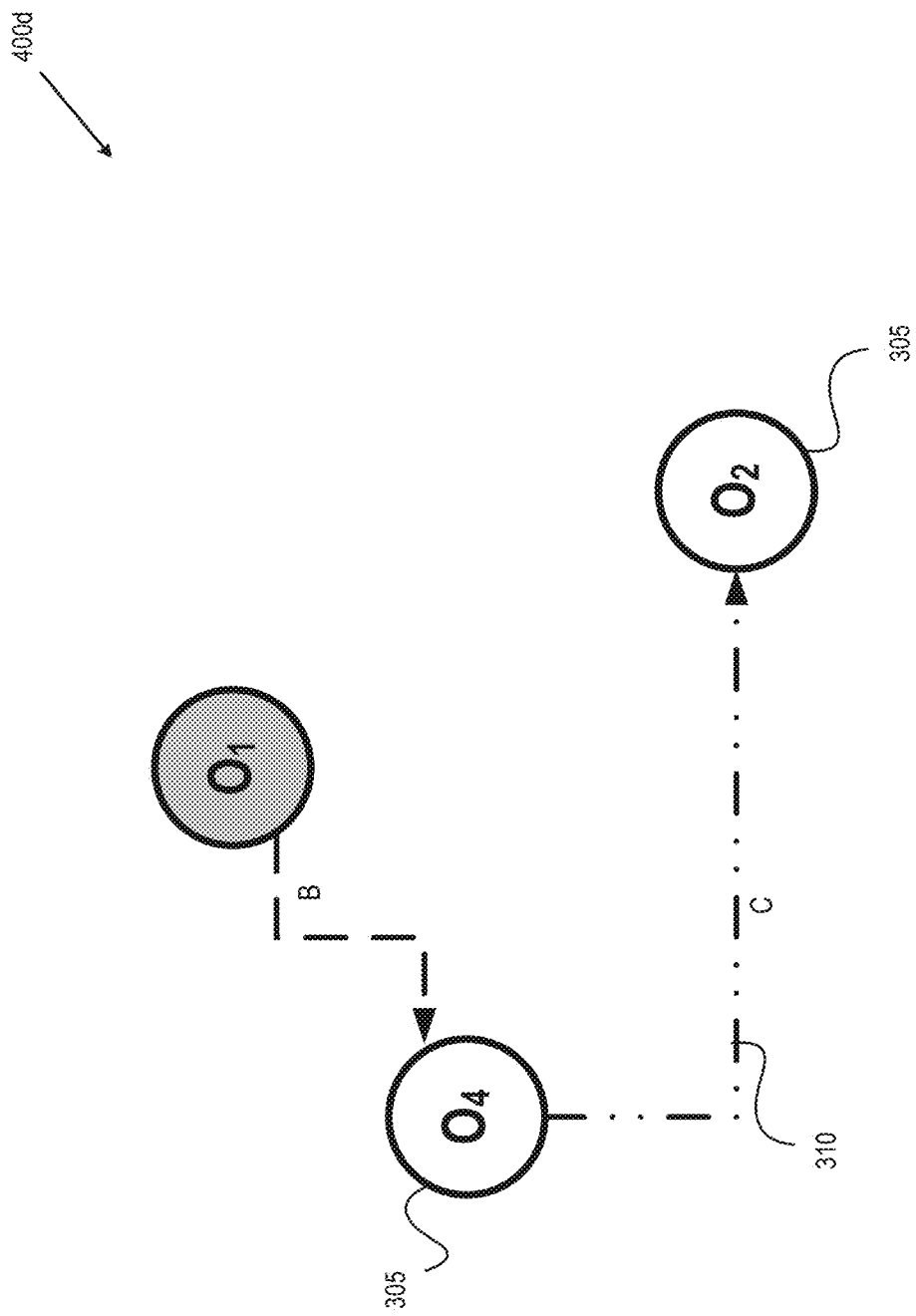

NETWORK SECURITY PATH IDENTIFICATION AND VALIDATION

TECHNICAL FIELD

One or more implementations relate to the field of multi-node network systems; and more specifically, to the network security path identification and validation of the multi-node network systems.

BACKGROUND ART

Networks may be composed of a number of logical or physical entities that are allowed to communicate between one another. For example, some networks may include a number of physical devices (e.g., different computing devices, different processors, different cores of a multi-core processor, server entities, etc.) or logical devices (e.g., different virtual machines.)

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIGS. 4A, 4B, 4C, and 4D (collectively, "FIG. 4") illustrate different examples of paths between two nodes of the ACG of FIG. 3, according to some example implementations.

DETAILED DESCRIPTION

Figure 1:
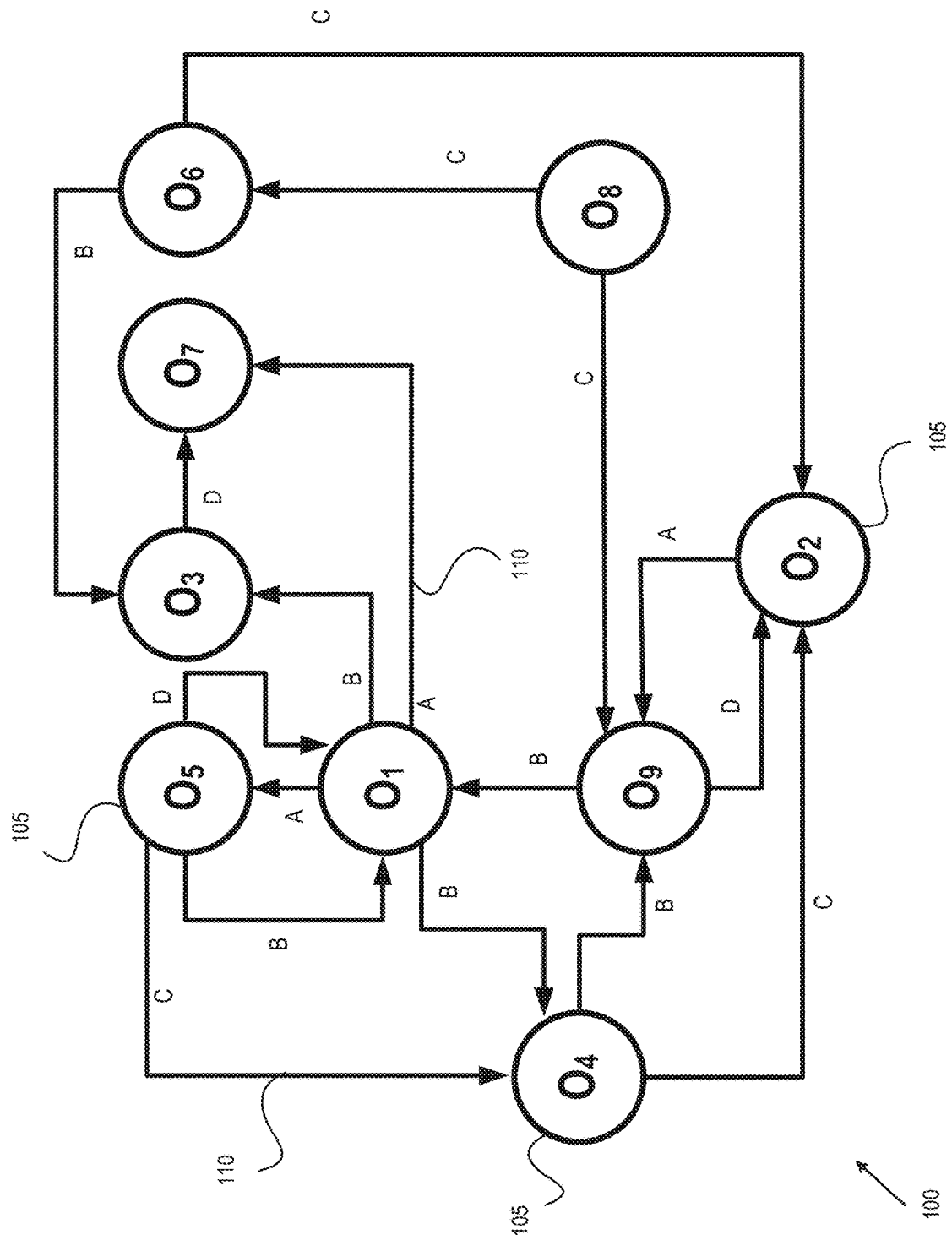
FIG. 1 is an example multi-directed graph of a multi-node network, according to some example implementations.

The following specification describes implementations related to generating an ACG based on a NACL, and using the ACG to verify compliance with various security protocols of the network. Specifically, implementations herein may relate to identification of all data paths that allow two objects of a network to communicate. This identification may be referred to as "network security path identification".

Implementations may further relate to validation of the identified paths against one or more sets of predetermined security-related policies (which may also be referred to as "patterns"). This validation may be referred to herein as "network security paths validation".

In mathematics, and more specifically in graph theory, a node is the fundamental unit of which graphs are formed. In the context of discussions of embodiments herein, a graph node may represent a network. As previously noted, networks may be composed of a number of logical or physical entities that are allowed to communicate between one another. For example, some networks may include a number of physical devices (e.g., different computing devices, different processors, different cores of a multi-core processor, server entities, etc.) or logical devices (e.g., different virtual machines.) Such physical or logical devices may be referred to as "nodes." In some cases, a node may additionally or alternatively refer to a collection of physical or logical devices (e.g., a "network" or "sub-network" with a number of hosts). Communication between the nodes (e.g., whether node A is allowed to communicate with node B) may be governed by a set of rules that may be referred to as a network access control list (NACL).

The ACG may be generated based on various node-related classification features of nodes of the network, as well as edge-related classification features of communicative couplings of the various nodes. Various paths of the network may then be reviewed based on the ACG to identify whether the network complies with one or more pre-defined security policy sets of the network. It will be noted that, in the following description, the communicative couplings between nodes may be referred to as "edges" of the ACG.

Generally, the identification and validation of communication paths within the network may involve the following five elements:

(1) Modeling the NACL. Specifically, various nodes and communicative couplings between the nodes may be identified and modeled as a multi-directed graph. As used herein, the term "multi-directed graph" may refer to a graph that includes a plurality of nodes with one or more edges between respective ones of the nodes. Edges of the graph are "directed." That is, communication may pass from Node A to Node B, but not from Node B to Node A. According to some implementations, respective ones of the edges may be associated with a specific "service," which may be some form of data analysis or handling that is associated with a specific connection between two nodes.

(2) Object Classification. Specifically, nodes of the multi-directed graph may be classified based on one or more node-related classification features of the node. Such features may be, for example, network location, network security posture, or some other type of classification. Edges of the multi-directed graph may also be classified based on one or more edge-related classification features. Such features may be, for example, related to authentication, authorization, encryption, or some other feature.

(3) ACG Generation. Specifically, generating the ACG based on the multi-directed graph, the node classifications, and the edge classifications.

(4) Path Identification. Specifically, identifying paths between nodes of the ACG. In some implementations all paths between two specific nodes of the ACG may be identified. In other implementations, only one path between two specific nodes (e.g., the shortest path between the two nodes) of the ACG may be identified.

In other implementations all paths between all nodes of the ACG may be identified.

(5) Secure path validation. Specifically, pattern matching may be applied to the paths identified at element (4) to identify whether any of the identified paths violate a given set of security policies. Such security policies may be pre-identified security policies related to, for example, compliance and/or validation.

It will be noted that this particular sequence of elements is intended as an example sequence for the sake of discussion of various implementations of the technique. The described sequence is not intended to be definitive, and real-world implementations may vary in terms of the order in which elements are performed.

(1) Modeling the NACL

Initially, nodes and communicative couplings of the NACL may be identified, and used to generate a multi-directed graph as previously described. Identification of the nodes and the communicative couplings may be performed based on one or more mechanisms. For example, in some implementations, the electronic device performing the modeling may identify features of the nodes or communicative couplings based on one or more tables related to the NACL. In some implementations, the electronic device may poll one or more of the nodes (e.g., by transmitting an information request to the node and reviewing data provided in an information response). In some implementations, a user may manually enter data related to the NACL into a table, spreadsheet, or some other database. Other techniques may be used in other implementations.

As an illustrative example of concepts herein, it may be assumed that a network has nine nodes (named $O_1$ through $O_9$) that may communicate with one another using four services, which may be referred to herein as "A", "B", "C", and "D". In this example, there may be 17 rules related to how the nodes are allowed to communicate based on the various services. Specifically, communication within the network may be limited to the following:

$O_1 \rightarrow O_5$ with service A
$O_1 \rightarrow O_7$ with service A
$O_1 \rightarrow O_3$ with service B
$O_1 \rightarrow O_4$ with service B
$O_2 \rightarrow O_9$ with service A
$O_3 \rightarrow O_7$ with service D
$O_4 \rightarrow O_9$ with service B
$O_4 \rightarrow O_2$ with service C
$O_5 \rightarrow O_1$ with service B
$O_5 \rightarrow O_1$ with service D
$O_5 \rightarrow O_4$ with service C
$O_6 \rightarrow O_3$ with service B
$O_6 \rightarrow O_2$ with service C
$O_5 \rightarrow O_6$ with service C
$O_5 \rightarrow O_9$ with service C
$O_9 \rightarrow O_1$ with service B
$O_9 \rightarrow O_2$ with service D After identifying the various connections and associated services, the NACL may be modeled as is shown in FIG. 1. Specifically, FIG. 1 is an example multi-directed graph 100 of a multi-node network, according to some example implementations. As may be seen, there are nine nodes 105. The nodes 105 are $O_1$ through $O_9$. Additionally, respective ones of the nodes 105 may be coupled by edges 110 which are additionally labelled with their respective services (A, B, C, or D). It will be noted that, for the sake of clarity and readability of the Figure, each and every node 105 and edge 110 are not labelled in FIG. 1.

(2) Object Classification

Nodes and edges (which correspond to services) of the NACL identified above may then be classified according to one or more features.

Node Classification

Various ones of the nodes 105 of the graph 100 may be classified based on one or more features of the node. These classifications may be referred to as node-related classification. In one example, if a node has an internet protocol version 4 (IPv4) address, then network object classifications may be performed based on the internet protocol (IP) address of the node. Specifically, private addresses may be given the designator "Class I." Multicast addresses may be given the designator "Class II." Public addresses may be given the designator "Class III." Local addresses may be given the designator "Class IV." Reserved addresses may be given the designator "Class V."

It will be understood that this specific classification feature (e.g., a node-related classification feature based on IP address) is only intended as one example. In some implementations, additional or alternative classification features may be used such as: Security Zone (i.e. DeMilitarized Zone, Private Network, Test Network, External Network), Category (End User Network, Transport Network, Datacenter Network, External Network), Role (Management Network, Log Network, Storage Network, Provisioning Network, System Interfaces Network), Segment (Production, Test, Development, Staging).

Figure 2:
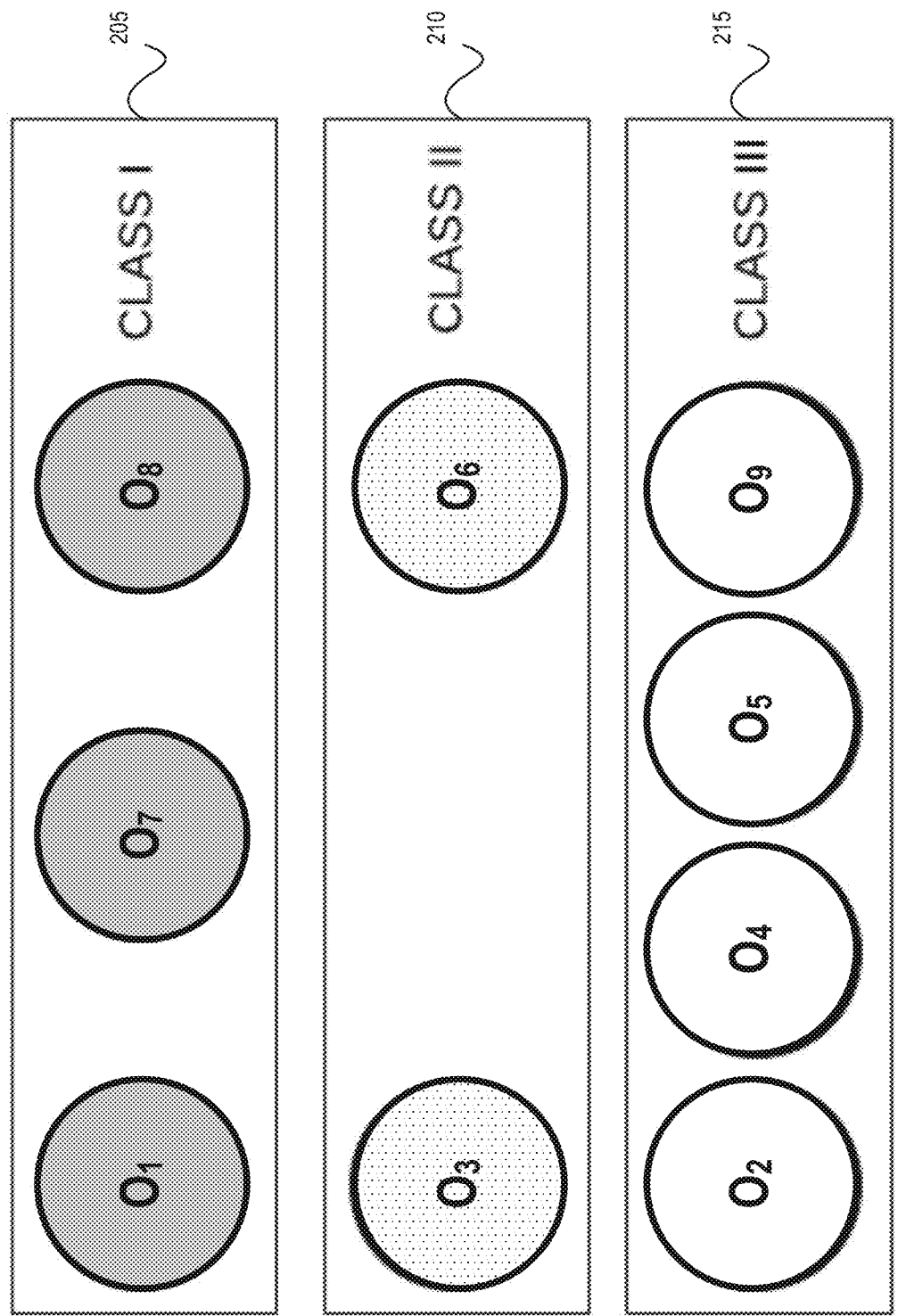
FIG. 2 illustrates an example of groupings of nodes of the multi-directed graph of FIG. 1 by class, according to some example implementations.

For the sake of the illustrative example herein, it may be assumed that the nodes are classified as shown in FIG. 2. Specifically, FIG. 2 illustrates an example of groupings of nodes of the multi-directed graph 100 of FIG. 1 by class, according to some example implementations. In FIG. 2, the various nodes are shaded differently for the purposes of distinction in later discussion. As may be seen, nodes $O_1$, $O_7$, and $O_5$ are grouped together as belonging to Class I at 205. Nodes $O_3$ and $O_6$ are grouped together as belonging to class II at 210. Nodes $O_2$, $O_4$, $O_5$, and $O_9$ are grouped together as belonging to class III at 215. As previously noted, this specific grouping is intended only for the sake of this example, and other implementations may include different groupings, groupings with more or fewer classes, classes that are labeled or named differently, etc.

In some implementations, classifying the nodes may include creating a dictionary or lookup table (or some other structure) that relates each node to the corresponding class. In some implementations, each classification may correspond to a different lookup table. For example, if nodes are classified according to IP address as one classification feature, and physical location as another feature, each of those classification features may correspond to the same or different lookup tables.

In this example, as there is only one classification, then the lookup table may be implemented in a dictionary that is referred to as $N_{class}$ as shown in Table 1, below.

TABLE 1

| $N_{Class}$ - Node Lookup Table | |
|---|---|
| Node | Class |
| $O_1$ | I |
| $O_2$ | III |
| $O_3$ | II |
| $O_4$ | III |
| $O_5$ | III |
| $O_6$ | II |
| $O_7$ | I |

TABLE 1-continued $N_{Class}$ - Node Lookup Table

| Node | Class |
|---|---|
| $O_8$ | I |
| $O_9$ | III |

Edge Classification

In addition to the node classification discussed above, various of the edges 110 of the graph 100 may be similarly classified. The classification of the edges 110 may be based on edge-related features of the edges. The edge-related classification features may be based, for example, on the services (e.g., services A, B, C, or D) provided by the different communicative couplings between the nodes 105. Such features may include one or more of the following: authentication (e.g., does the relevant service require some form of authentication); authorization (e.g., does the relevant service require some form of authorization); and encryption (e.g., does the service provide encrypted data during transport between nodes). It will be understood that these features are intended as one example of such edge-related classification feature, and other features may be used in other implementations such as: protocol level of the network service (e.g. physical, data-link, network, transport, application), transport level of the network service (tcp, udp, icmp, others, not-available), flow-type of the service (non-interactive-data, video-stream, audio-stream, interactive, signaling, management), quality-of-service (high-priority, low-priority, best-effort, scavenger).

In the example herein, the edge-related classification features include authentication, authorization, and encryption, which may all be true/false parameters. Therefore, there may be 8 possible combinations of the features above. Specifically:

Class 0: 000: non-authenticated/non-authorized/non-encrypted

Class 1: 001: non-authenticated/non-authorized/encrypted

Class 2: 010: non-authenticated/authorized/non-encrypted

Class 3: 011: non-authenticated/authorized/encrypted

Class 4: 100: authenticated/non-authorized/non-encrypted

Class 5: 101: authenticated/non-authorized/encrypted

Class 6: 110: authenticated/authorized/non-encrypted

Class 7: 111: authenticated/authorized/encrypted

For the sake of this example, the services A, B, C, and D may be classified in accordance with the above-listed classes. For example, service A may be associated with Class 7. Service B may be associated with Class 6. Service C may be associated with class 4. Service D may be associated with class 0.

Similarly to the node-related classification features, classification of the services may be based on creating a dictionary, lookup table, or some other data structure that maps the service to the corresponding class. Different classifications (e.g., classifications of the services based on differing factors) may be done in the same or different lookup tables.

In this example, as there is only one classification, then the lookup table may be implemented in a dictionary that is referred to as $E_{class}$ as shown in Table 2, below.

TABLE 2

$E_{Class}$ - Edge Lookup Table

| Service | Class |
|---|---|
| A | 7 |
| B | 6 |
| C | 4 |
| D | 0 |

Similarly to other specific details of the example herein, it will be understood that the above details of the types of features used, the specific classifications, the types or number of services, etc. are intended as an example of one implementation, and such parameters may vary in other implementations.

(3) ACG Generation

Figure 3:
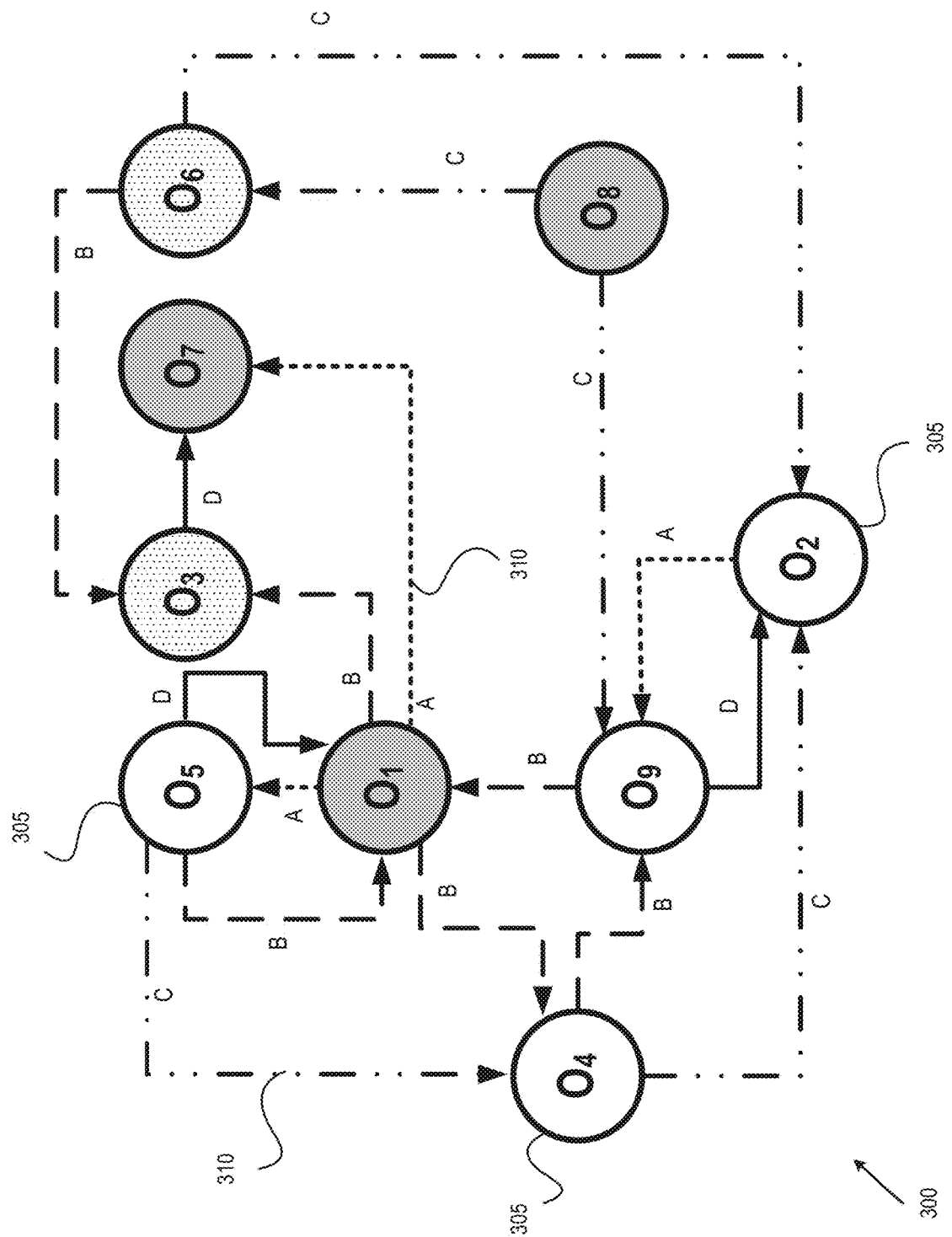
FIG. 3 illustrates an example of an access control graph (ACG), according to some example implementations.

When the node and edge classification at (2) is complete, then an ACG may be defined as depicted in FIG. 3. Specifically, FIG. 3 illustrates an example of an ACG 300, according to some example implementations. The ACG 300 may include nodes 305. The nodes 305 may be similar to nodes 105, and additionally include information related to the classification of the nodes as depicted in FIG. 2 (as represented by the different shading). The ACG 300 may additionally include edges 310. The edges 310 may be similar to edges 110, but also include information related to the classification of the various services (A, B, C, and D) of the edges 310. Such information is represented by the dashed lines of FIG. 3. More specifically, the ACG may be defined as a composite object that represents, in a single model, the NACL as a multi-directed graph, the node-related classification features of nodes of the multi-directed graph, and edge-related classification features of edges of the multi-directed graph.

As previously noted, it will be understood that the shading and the structure of the lines of the edges 310 is for the sake of visualization of this structure for the purpose of discussion herein, and other implementations may represent such information in a different manner.

The ACG 300 of FIG. 3 may then be used for path identification and validation. Specifically, compliance policies may exist that specify whether or not connections between two nodes, service(s) between two nodes, or a path between two nodes should be allowed or exist based on pre-defined security policy sets of the network. Compliance policies may be defined in a positive form (e.g., as rules that depict allowable aspects of the network) or negative form (e.g., as anti-rules that depict unallowable aspects of the network). The policies may be used to validate aspects of the ACG.

As specific examples, compliance policies may refer to nodes of the network. One such positive compliance policy may be, as an example, "use as a destination only networks smaller than 65536 hosts." A similar negative compliance policy may be, as an example, "do not use a destination network with greater than 65536 hosts."

Compliance policies may additionally or alternatively refer to edges of the ACG. One such positive compliance policy may be, as an example, "nodes of different classes must communicate with encrypted protocols." A similar negative compliance policy may be, as an example, "nodes of different classes may not communicate with unencrypted protocols."

Compliance policies may additionally or alternatively refer to paths of an ACG. As used herein, a path may refer to a structure between two nodes of the ACG. In some cases, a path may relate to a direct connection between the two nodes such that they communicate using a single edge. In other cases, a path may include one or more intermediary nodes and additional edges. An example of a positive compliance policy related to paths may be, for example, "a communication path between public and private networks must use authenticated protocols." A similar example of a negative compliance policy related to paths may be, for example, "a communication path between public and private networks may not use un-authenticated protocols."

The compliance policies may be translated into validation policies for edges, nodes, and or paths of the ACG. Specifically, node compliance may be verified by validating the compliance policies against all nodes of the network. This node validation test may have a complexity of $C_{RN}*O(N)$ where $C_{RN}$ is a constant that depends on how many node compliance policies are defined and/or how long it takes to validate the node compliance policies, and N refers to the number of nodes in the network. Similarly, edge compliance may be verified by validating the compliance policies against all edges of the network. This edge validation test may have a complexity of $C_{RE}*O(E)$ where $C_{RE}$ is a constant that depends on how many edge compliance policies are defined and/or how long it takes to validate the edge compliance policies, and E refers to the number of edges of the network.

Path compliance may also be verified by validating the compliance policies against one or more paths of the network. $O(N*(N+E))$ may be defined as the complexity of finding all paths between a source and a destination. $C_{RP}$ may be a constant that depends on how many path compliance policies are defined, and/or how long it takes to validate the path compliance policies. $N*(N-1)$ may be defined as the total number of possible ordered pairs of nodes. Therefore, the total complexity of the path compliance validation may be $O(N^2*N*(N+E))=O(N^4*E)$. Therefore, it may be observed that validating path compliance of a given ACG may have a complexity that grows with the fourth power of the number of nodes, and linearly with the number of edges. However, if it is only desired to validate compliance of all simple paths between a given pair of nodes, then the complexity may be reduced such that it grows with the square of the number of nodes, and linearly with the number of edges of the ACG.

(4) Path Identification and (5) Path Validation

Path identification and validation may include one or more of the following elements to identify and verify paths and their compliance between two given nodes. For the sake of this generalized discussion, the two nodes may be referred to as "$N_{src}$," which may be a source or origination node from which data is transmitted, and "$N_{dst}$," which may be a destination node to which the data is transmitted. The path identification and validation may include:

(i) Identify the node classes of $N_{src}$ and $N_{dst}$, for example using the lookup table/dictionary/data structure $N_{class}$ of Table 1.
(ii) Identify the applicable compliance policies for a path. One such compliance policy related to a path may be as described above.
(iii) Identify the secure paths between $N_{src}$ and $N_{dst}$.
(iv) Validate the secure paths between $N_{src}$ and $N_{dst}$ based on the policies identified at (ii).

More specifically:

(IV) Path Identification

Using graph routing techniques identify all paths between $N_{src}$ and $N_{dst}$. Such graph routing techniques may include a shortest-path algorithm and/or a depth-first algorithm. The shortest-path algorithm may be, e.g. Dijkstra algorithm, Bellman-Ford algorithm, or some other algorithm. In some implementations, the depth-first algorithm may be applied subsequent to the application of the shortest-path algorithm. The selection of the graph routing technique may be dependent on factors such as, for example, whether or not path compliance is required, the size of the ACG, processing time or resource limitations, or other factors. If only a single path exists between $N_{src}$ and $N_{dst}$, or if it is only desired to validate a single path, then a relatively quicker shortest-path algorithm may be used. In this situation, the complexity for finding and verifying a single path may be $O(N+E \log N)$. However, if all paths between two nodes are required to be validated, then the depth-first algorithm may additionally or alternatively be used.

The identified paths may be defined as a sequence of nodes and edges, and be listed in a list $P_{List}$ that may list all possible paths (with all possible services) between $N_{SRC}$ and $N_{DST}$ in the ACG. Specifically, $P_{List}=[P_1, P_2, P_3, \ldots P_n]$.

(V) Path Validation

Path validation may then be performed. Specifically, for each $P_i$ in $P_{List}$, the table $E_{class}$ (e.g., Table 2) may be used to verify whether or not the properties of the edge of the ACG connecting two adjacent nodes in the path (Edge $[P_{i-1}, P_i]$) comply with the applicable edge or path-related compliance policies. If a compliance violation occurs, e.g., the edge, node, or path under review violates a pre-identified security policy, then that violation may be logged for later output or review (e.g., by a user or system administrator of the network, or an alternative piece of hardware, firmware, or software that is associated with network security compliance).

ACG Identification and Validation, Example 1:

A specific example of ACG identification and validation may be as follows. This example may be described with reference to the ACG 300 of FIG. 3. For the sake of this description, the following terminology is used: "OK" refers to a result where the path under analysis complies with the pre-defined policy. "KO" refers to a policy set where the path under analysis does not comply with the predefined policy. "Skip" refers to a result where the rule is inapplicable to the path under analysis. For the sake of this example, the only compliance policy may be an edge-based policy that applies to all edges connecting nodes that belong to different classes. The policy may state, "all direct communications between nodes that belong to different classes must be authenticated and encrypted." The terminology $E(O_j, O_k)$ may refer to an edge wherein node $O_j$ is a source node and $O_k$ is a destination node.

For the ACG 300, the following may be observed:

$E(O_1, O_5)$ connects nodes of different classes by service A. Service A is authenticated and encrypted. Result: OK.

$E(O_1, O_7)$ connects nodes of the same class. Result: Skip.

$E(O_1, O_3)$ connects nodes of different classes by service B. Service B is authenticated and non-encrypted. Result: KO.

$E(O_1, O_4)$ connects nodes of different classes by service B. Service B is authenticated and non-encrypted. Result: KO.

$E(O_2, O_9)$ connects nodes of the same class. Result: Skip.

$E(O_3, O_7)$ connects nodes of different classes by service D. Service D is non-authenticated. Result: KO.

$E(O_4, O_9)$ connects nodes of the same class. Result: Skip.

$E(O_4, O_2)$ connects nodes of the same class. Result: Skip.

$E(O_5, O_1)$ connects nodes of different classes by service B. Service B is authenticated and non-encrypted. Result: KO.

E($O_5$, $O_1$) connects nodes of different classes by service D. Service D is non-authenticated. Result: KO.

E($O_5$, $O_4$) connects nodes of the same class. Result: Skip.

E($O_6$, $O_3$) connects nodes of the same class. Result: Skip.

E($O_6$, $O_2$) connects nodes of different classes by service C. Service C is non-encrypted. Result: KO.

E($O_8$, $O_6$) connects nodes of different classes by service C. Service C is non-encrypted. Result: KO.

E($O_8$, $O_9$) connects nodes of different classes by service C. Service C is non-encrypted. Result: KO.

E($O_9$, $O_1$) connects nodes of different classes by service B. Service B is authenticated and non-encrypted. Result: KO.

E($O_9$, $O_2$) connects nodes of the same class. Result: Skip.

As a result of the above analysis, it may be identified that the ACG 300 does not comply with the identified policy. The compliance failures in this example are E($O_1$, $O_3$), E($O_1$, $O_4$), E($O_3$, $O_7$), E($O_5$, $O_1$), E($O_5$, $O_1$), E($O_6$, $O_2$), E($O_8$, $O_6$), E($O_8$, $O_9$), and E($O_9$, $O_1$).

Path Identification and Validation, Example 2:

A specific example of path identification and validation may be as follows. This example may be described with reference to ACG 300. The purpose of the validation may be to verify compliance with the following policy, "all direct and indirect communications from private to public networks must be authenticated and authorized." It may be desired to verify compliance of all paths between $O_1$ (the source node) and $O_2$ (the destination node).

Figure 4A:
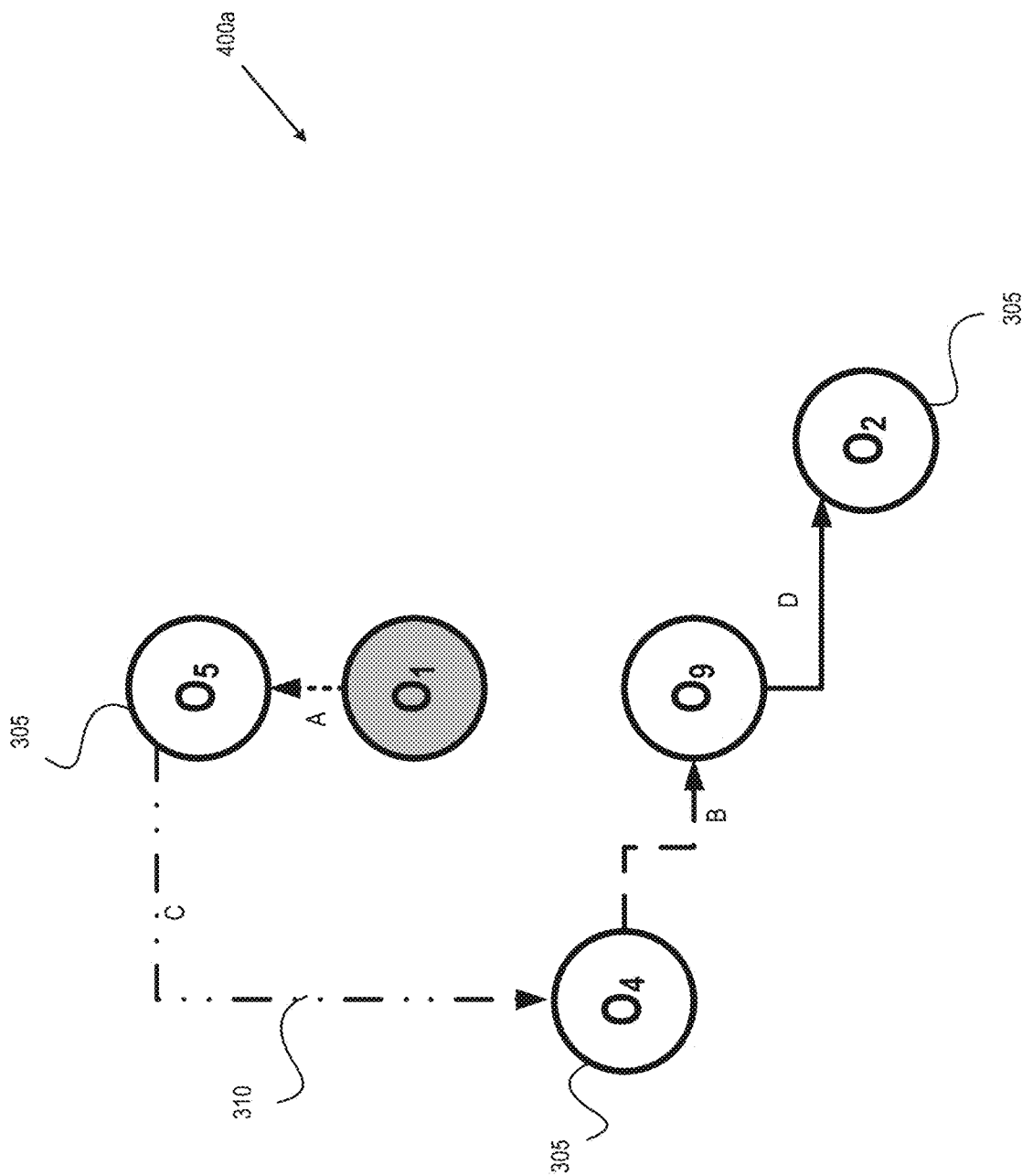

The paths between $O_1$ and $O_2$ may be as follows:

$P_1$=[$O_1$, $O_5$, $O_4$, $O_9$, $O_2$]. This path 400a is depicted at FIG. 4A.

Figure 4B:
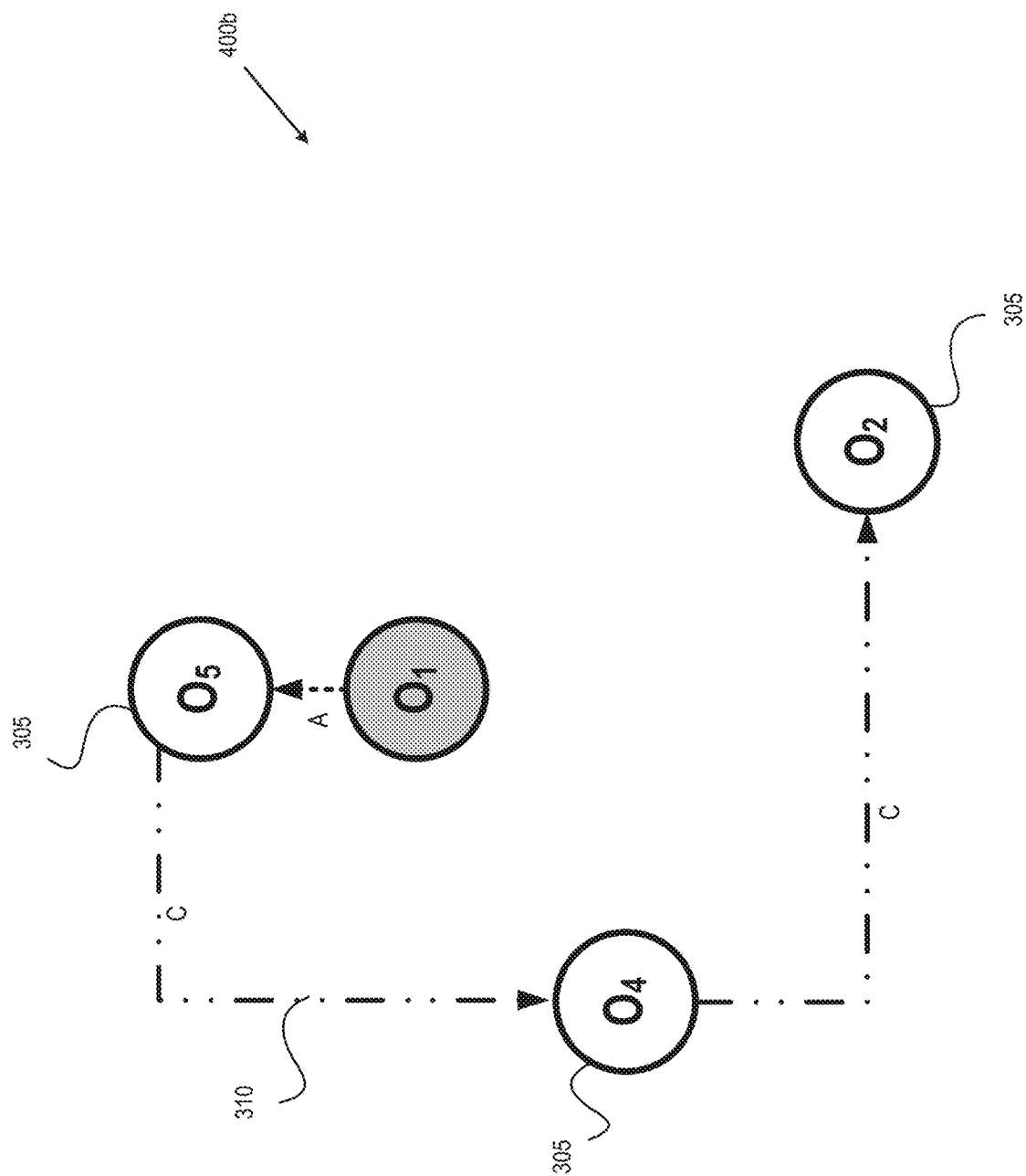

$P_2$=[$O_1$, $O_5$, $O_4$, $O_2$]. This path 400b is depicted at FIG. 4B.

Figure 4C:
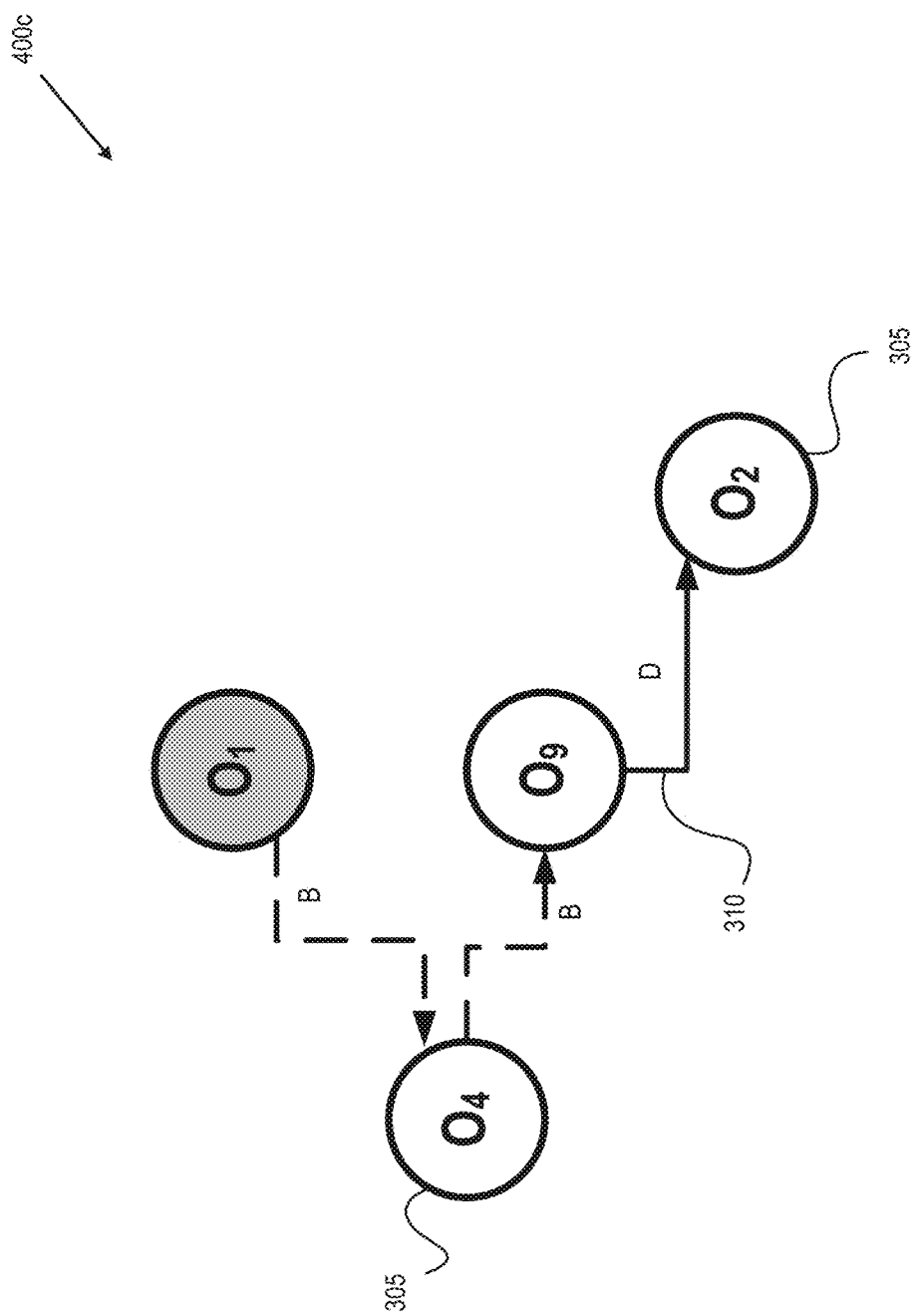

$P_3$=[$O_1$, $O_4$, $O_9$, $O_2$]. This path 400c is depicted at FIG. 4C.

$P_4$=[$O_1$, $O_4$, $O_2$]. This path 400d is depicted at FIG. 4D.

Specifically, FIGS. 4A, 4B, 4C, and 4D may depict the different paths 400a, 400b, 400c, and 400d, between $O_1$ and $O_2$, while additional elements of the ACG 300 that are not in those paths are removed for the sake of ease of viewing.

Paths $P_1$, $P_2$, $P_3$, and $P_4$ may then be validated in a manner similar to that described above. Because the intention of this example is to validate compliance of the overall path, compliance failure of an edge of a path may result in compliance failure of the path. As such, upon indication of non-compliance (e.g., a result of "KO"), further analysis of the path may not be performed. However, it will be understood that this particular analysis may only be specific to this example, and in other examples it may be desirable to gather further data related to the path. Therefore, analysis of the entire path may be performed regardless of whether a compliance failure of a single edge (or node) of the path is identified.

With respect to the validation of $P_1$:

E($O_1$, $O_5$) connects nodes by service A, which is authenticated and authorized. Result: OK.

E($O_5$, $O_4$) connects nodes by service C, which is authenticated and non-authorized. Result: KO.

Result: $P_1$ is not compliant to the identified rule. Compliance failure: E($O_5$, $O_4$).

With respect to the validation of $P_2$:

E($O_1$, $O_5$) connects nodes by service A, which is authenticated and authorized. Result: OK.

E($O_5$, $O_4$) connects nodes by service C, which is authenticated and non-authorized. Result: KO.

Result: $P_2$ is not compliant to the identified rule. Compliance failure: E($O_5$, $O_4$).

With respect to the validation of $P_3$:

E($O_1$, $O_4$) connects nodes by service B, which is authenticated and authorized. Result: OK.

E($O_4$, $O_9$) connects nodes by service B, which is authenticated and authorized. Result: OK.

E($O_9$, $O_2$) connects nodes by service D, which is non-authenticated and non-authorized. Result: KO.

Result: $P_3$ is not compliant to the identified rule. Compliance failure: E($O_9$, $O_2$).

With respect to the validation of $P_4$:

E($O_1$, $O_4$) connects nodes by service B, which is authenticated and authorized. Result: OK.

E($O_4$, $O_2$) connects nodes by service C, which is authenticated and non-authorized. Result: KO.

Result: $P_4$ is not compliant to the identified rule. Compliance failure: E($O_4$, $O_2$).

Implementation Example Related to all Paths Between Two Nodes of an ACG

In some implementations, identification logic (which may be implemented by an electronic device, a portion thereof, or some other hardware/software/firmware or combination thereof) may perform various of the functions described above related to all paths of an ACG. For example, given an ACG such as ACG 300 of FIG. 3, the core identification logic may retrieve classification information related to source and destination nodes ($N_{src}$ and $N_{dst}$). Such information may be retrieved from a table such as Table 1, above. The core identification logic may also identify edges and/or paths between $N_{src}$ and $N_{dst}$. For respective edges and/or paths, the core identification logic may further retrieve information related to the classification of edges connecting two adjacent nodes in a given path. Such information may be retrieved from a table such as Table 2, above.

Pseudocode for the above-described functions of the identification logic may be as follows. The dash characters ("-") are inserted for the sake of indicating structure of the pseudocode:

```
function print_all_paths(paths: List, src_node:int, dst_node:int):
- """Print all paths in the ACG between source and destination. """
- print ("Showing all paths between Node{ }[{ }] and Node { }[{ }]".format(
- - src_node, self.get_node_info(src_node),
- - dst_node,self.get_node_info(dst_node)))
- cnt = 0
- all_paths = nx.all_simple_edge_paths(self.ACG, source=src_node, target=dst_node)
- for path in all_paths:
- - cnt += 1
- - print(" Path :: { }".format(cnt))
- - for edge in path:
- - - src = edge[0]
- - - dst = edge[1]
- - - data = self.ACG.get_edge_data(src, dst)[edge[2]]
- - - service_details =
"name:{ },class:{ },encrypted:{ }".format(data['service'],
- - - data['class'], data['encrypted'])
- - print(str(src) + " - " + str(dst) + " :: " + service_details)
- print ("Found { } paths between { } and { }",cnt, src_node, dst_node)
```

Figure 5:
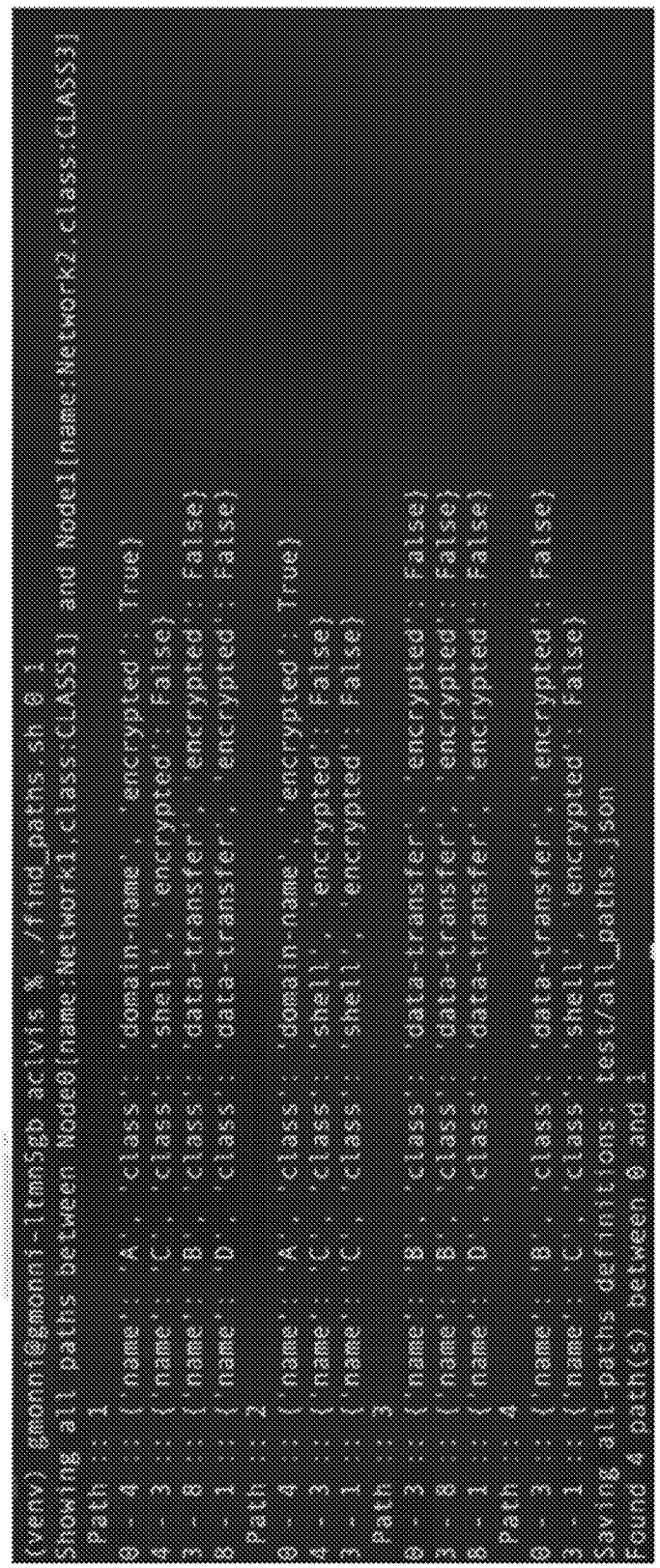
FIG. 5 illustrates example output of a portion of a compliance and validation tool related to the ACG of FIG. 3, according to some example implementations.

FIG. 5 illustrates example output 500 of a portion of a compliance and validation tool related to the ACG 300 of FIG. 3, according to some example implementations. Specifically, FIG. 5 depicts example output 500 of the pseudocode above when performed to find all paths between a node named Network1 (corresponding to node $O_1$ in ACG 300) and a node named Network2 (corresponding to node $O_2$ in ACG 300) using an ACG such as ACG 300.

Figure 6:
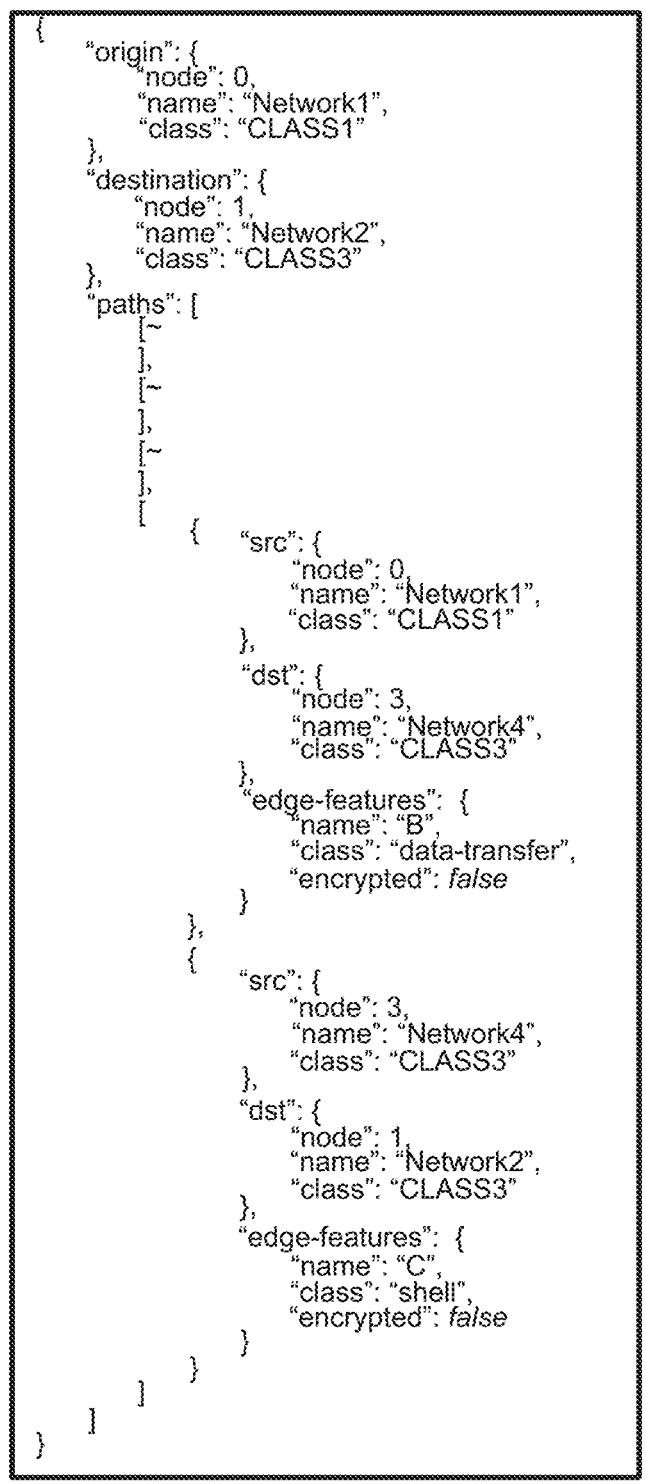
FIG. 6 illustrates example output of another portion of a compliance and validation tool related to the ACG of FIG. 3, according to some example implementations.

The example output 500 may be exported in javascript object notation (JSON) format, and then processed to verify compliance. FIG. 6 illustrates example output 6 of another portion of a compliance and validation tool related to the ACG 300 of FIG. 3, according to some example implementations. Specifically, FIG. 6 depicts an example output 600 of compliance verification based on the output 500 of FIG. 5.

Implementation Example Related to Shortest Path Identification Between Two Nodes in an ACG In some implementations, identification logic (which may be similar to the identification logic described with respect to the implementation example described above) may perform various of the functions described above related to one path of an ACG. For example, given an ACG such as ACG 300 of FIG. 3, the core identification logic may retrieve classification information related to source and destination nodes ($N_{src}$ and $N_{dst}$). Such information may be retrieved from a table such as Table 1, above. The core identification logic may also compute the shortest path in the ACG between $N_{src}$ and $N_{dst}$. Such computation may be based on one or more of the path-computation techniques described above. The core identification logic may then provide an indication of that path.

Pseudocode for the above-described functions of the identification logic may be as follows. The dash characters ("-") are inserted for the sake of indicating structure of the pseudocode:

```
function find_path(paths: List, src_node:int, dst_node:int):
- """Find a path in the ACG between source and destination. """
- print ("Finding shortest path between Node{ }[{ }] and
Node{ }[{ }]".format(
- - src_node, self.get_node_info(src_node),
- - dst_node,self.get_node_info(dst_node))
- cnt = 0
- shortpath = nx.shortest_path(self.ACG, source=src_node,
target=dst_node)
- If shortpath:
- - print(" { } and { } are connected through: { }".format(src_node,
   dst_node,
paths))
```

Figure 7:
FIG. 7 illustrates an example output of a path identification tool related to a path between two nodes of the ACG of FIG. 3, according to some example implementations.

FIG. 7 depicts example output 700 of performance of the above-depicted pseudocode applied to find the shortest path between a node named Network1 (corresponding to node $O_1$ in ACG 300) and Network2 (corresponding to node $O_2$ in ACG 300) on ACG 300.

Path Validation

In some implementations, identification logic such as that described above may be based on one or more software tools. One such software tool may be referred to as "aclvalidate," however other similar tools may have different names. Aclvalidate may be used to automate such compliance validation. Specifically, using a JSON file that includes information related to an ACG (e.g., ACG 300), the tool may validate, based on the JSON file, the nodes, the edges, and the paths against a set of compliance policies such as may be provided by another JSON file or some other form of data provisioning.

As a specific example herein, it may be presumed that there are three compliance policies (e.g., as provided by the JSON file). Policy 1 ($R_1$) may state, "all connections from private (class 1) nodes to public (class 3) nodes must be encrypted." Policy 2 ($R_2$) may state, "all connections from public (class 3) nodes to public (class 3) nodes must use service A." Policy 3 ($R_3$) may state "all connections from public (class 3) nodes to public (class 3) nodes must not be encrypted."

In this specific example, using the ACG 300 and the above policies, the tool aclvalidate may identify all paths between two nodes (e.g., $N_{src}$ and $N_{dst}$), although it will be understood that in other embodiments another tool may only identify a subset of paths between the two nodes. The tool may further identify the policies of the current policy set. Then, the tool may compare the policies of the policy set against each path in the list and/or each edge in a given path to verify edge-feature compliance and/or each node in a given path to verify node-feature compliance Pseudocode for the above-described functions of the validation logic may be as follows. The dash characters ("-") are inserted for the sake of indicating structure of the pseudocode:

```
def verify _features(paths: { }, ruleset: { }) -> [ ]:
- """Verify provided paths comply to the ruleset. """
- all_compliance_violations = [ ]
- for rule in ruleset["rules"]:
- - cur_rule_violations = [ ]
- - node_feature = rule["node-feature"]
- - edge_feature = rule["edge-feature"]
- - expected_val = rule["edge-value"]
- - for p in paths['paths']:
- - - path_violations = [ ]
- - - for hop in p:
- - - - must_comply = bool(
- - - - - rule["source"] in hop['src'][node_feature]
- - - - - and rule["destination"] in hop['dst'][node_feature]
- - - - )
- - - - actual_value = hop['edge-features'][edge_feature]
- - - - if must_comply and actual_value != expected_val:
- - - - - violation = {'src': hop['src']['node'],
- - - - - - 'src-{ }'.format(node_feature): hop['src'][node_feature],
- - - - - - - 'dst': hop['dst']['node'],
- - - - - - 'dst-{ }'.format(node_feature): hop['dst'][node_feature],
- - - - - - - edge_feature:actual_value,
- - - - - - - "message": rule["error-message"]}
- - - - - path_violations.append(violation)
- - - cur_rule_violations.append(path_violations)
- - all_compliance_violations.append(cur_rule_violations)
- return all_compliance_violations
```

Figure 8:
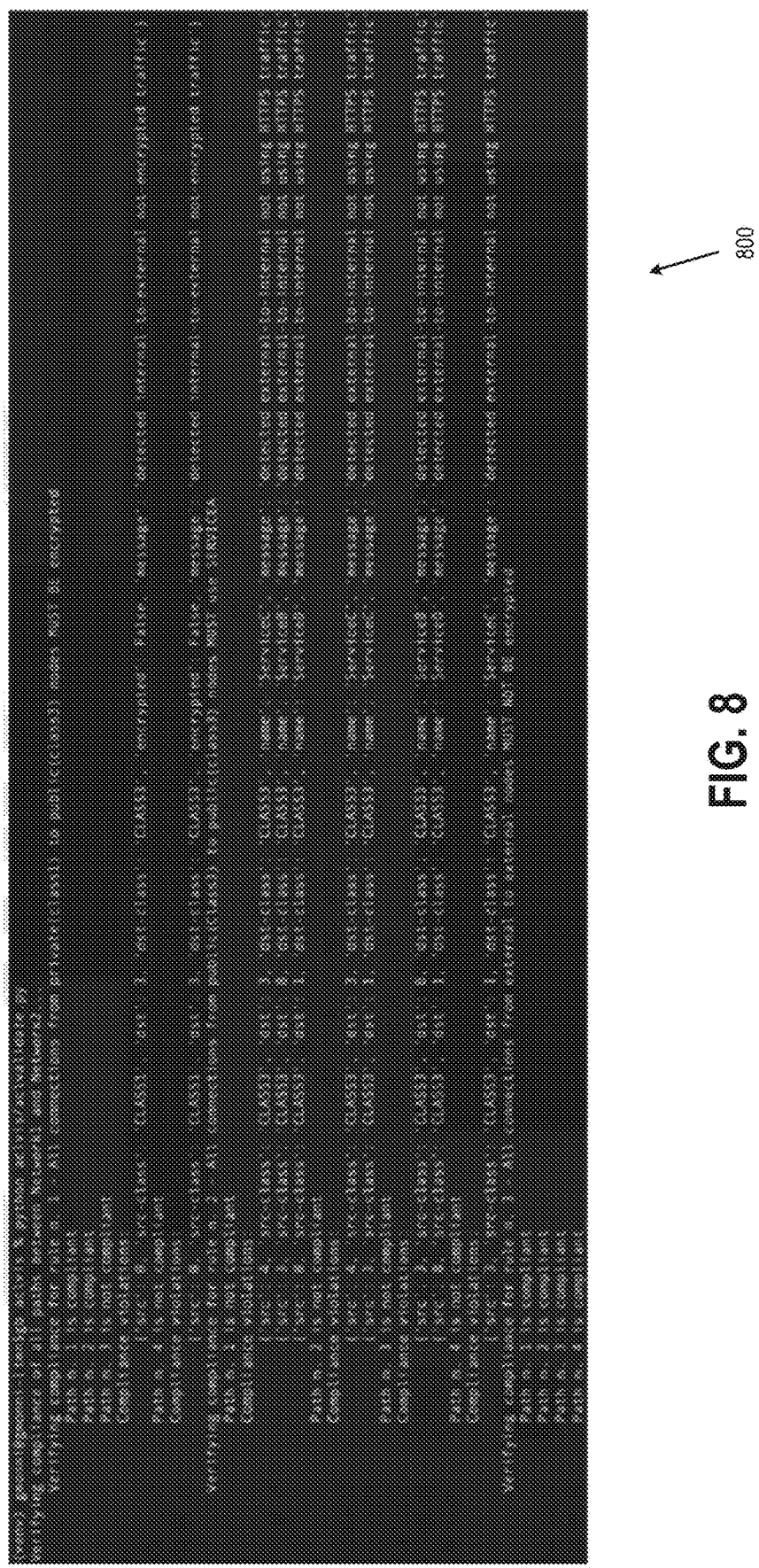
FIG. 8 illustrates example output of a tool related to path compliance of the ACG of FIG. 3, according to some example implementations.

FIG. 8 illustrates example output 800 of a tool related to path compliance of the ACG of FIG. 3, according to some example implementations. Specifically, FIG. 8 depicts example output 800 of performance of the above-depicted pseudocode using the data of the ACG 300 as an example.

The pseudo-code above may verify whether all paths comply with the given ruleset. Additionally, it may be seen by the output 800 that four paths are identified: $P_1$, $P_2$, $P_3$, and $P_4$. Path $P_2$ and $P_1$ are identified as compliant with rule $R_1$, while $P_3$ and $P_4$ are not compliant with rule $R_1$. All paths $P_1$-$P_4$ are identified as non-compliant with rule $R_2$. All paths $P_1$-$P_4$ are identified as compliant with rule $R_3$. It will further be noted that specific compliance violations are depicted in the output 800 of FIG. 8.

It will be understood that the above described example implementations, the above-described graph 100, the above-described ACG 300, are all examples of one specific implementation for the sake of discussion of the concepts presented herein. The depicted pseudocode, the number of elements or rules, the format of the pseudocode or resultant output, etc. may be different in other implementations.

Example Technique

Figure 9:
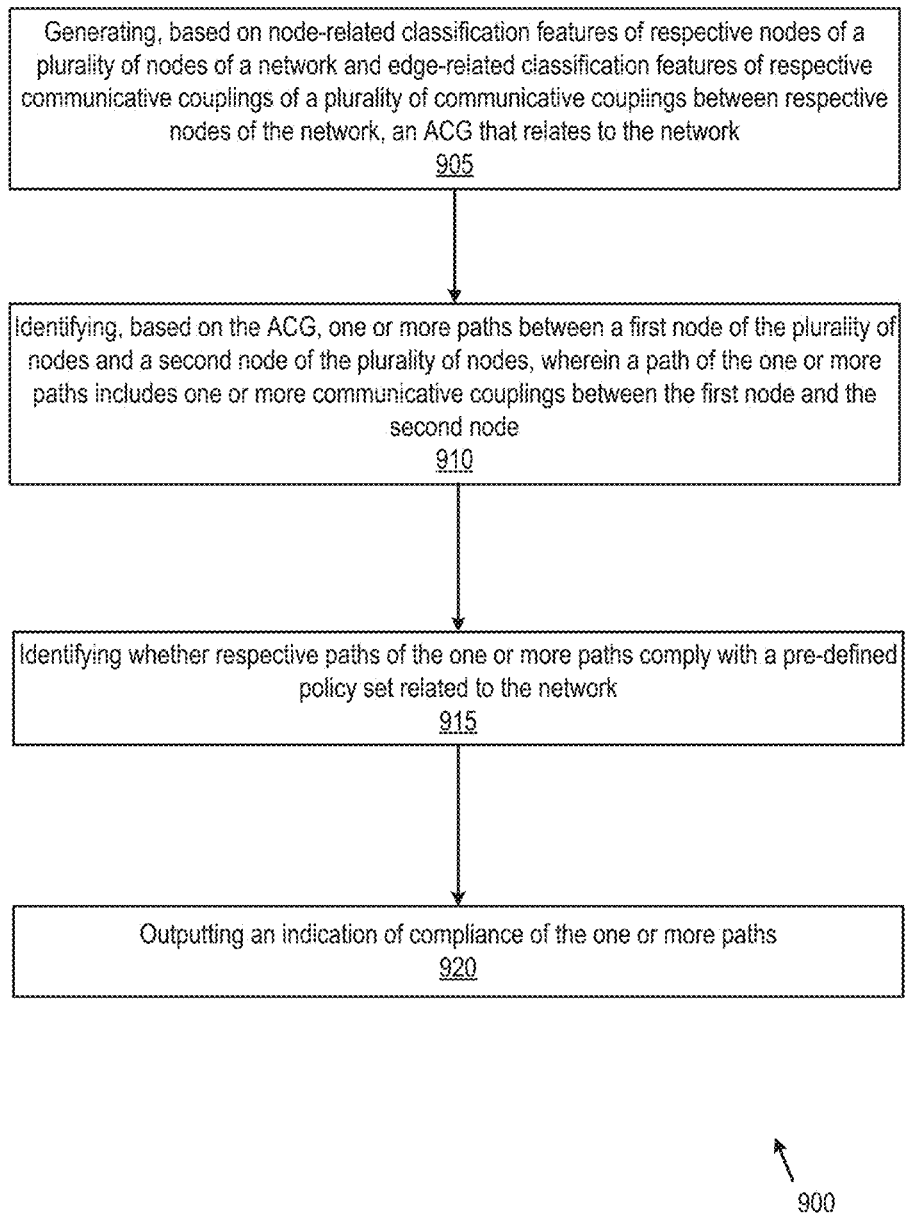
FIG. 9 depicts an example technique related to a path verification and compliance analysis tool of an ACG, according to some example implementations.

FIG. 9 depicts an example technique 900 related to a path verification and compliance analysis tool of an ACG, according to some example implementations. As noted, the technique 900 may be performed by identification logic of an electronic device that is part of, or coupled to, a multi-node network (e.g., the network that forms the basis for a graph such as graph 100 or an ACG such as ACG 300). The logic may be a processor, a core of a multi-core processor, or some other piece of hardware/software/firmware, or a combination thereof.

The technique 900 may include generating, at 905, an ACG that relates to a multi-nodal network. The generation of the ACG may be based on node-related classification features of respective nodes of a plurality of nodes of the network. Generation of the ACG may additionally be based on edge-related classification features of respective communicative couplings of a plurality of communicative coupling between respective nodes of the network. Such communicative couplings may be referred to as "edges."

The technique 900 may further include identifying, at 910 based on the ACG, one or more paths between a first node of the plurality of nodes (e.g., $N_{src}$) and a second node of the plurality of nodes (e.g., $N_{dst}$). As previously described, a path of the one or more paths may include one or more communicative couplings (e.g., edges) between the first node and the second node.

The technique 900 may further include identifying, at 915, whether respective paths of the one or more paths comply with a pre-defined security policy set related to the network. Rules of the security policy set may be positive and/or negative, as described above. The policies may further be node-related policies, edge-related policies, and/or path-related policies. As previously noted, the policies may be provided to the identification logic in a JSON file. In other implementations, the policies may be manually input by a user of an electronic device, they may be pulled from a pre-existing ruleset, table, or other database, or otherwise provided to the identification logic.

The technique 900 may further include outputting, at 920, an indication of compliance of the one or more paths. Such an indication may be similar to the output depicted above at any of FIGS. 5-8, or provided in some other format. In some implementations, the output may be a visual output (e.g., on a display or graphical user interface (GUI) accessible by a user). In other implementations, the output may be an output to a data file that is accessible by other software, hardware, and/or firmware of an electronic device such that further processing may be performed on the output.

It will be understood that the above-described implementation is intended as one example implementation for the sake of discussion of concepts herein. Other implementations may include more or fewer elements, elements arranged in a different order than depicted or discussed, etc.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 10A:
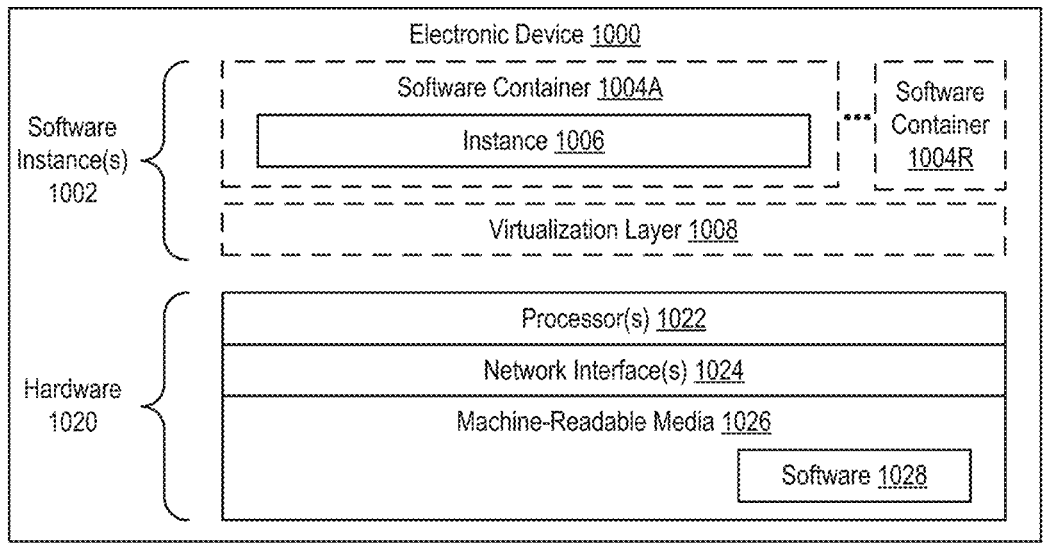
FIG. 10A is a block diagram illustrating an electronic device according to some example implementations.

FIG. 10A is a block diagram illustrating an electronic device 1000 according to some example implementations. FIG. 10A includes hardware 1020 comprising a set of one or more processor(s) 1022, a set of one or more network interfaces 1024 (wireless and/or wired), and machine-readable media 1026 having stored therein software 1028 (which includes instructions executable by the set of one or more processor(s) 1022). The machine-readable media 326 may include non-transitory and/or transitory machine-readable media. Each of the previously described clients and the network security path identification and validation service may be implemented in one or more electronic devices 1000. In one implementation: 1) each of the clients is implemented in a separate one of the electronic devices 1000 (e.g., in end user devices where the software 1028 represents the software to implement clients to interface directly and/or indirectly with the network security path identification and validation service (e.g., software 1028 represents a web browser, a native client, a portal, a command-line interface, and/or an application programming interface (API) based upon protocols such as Simple Object Access Protocol (SOAP), Representational State Transfer (REST), etc.)); 2) the network security path identification and validation service is implemented in a separate set of one or more of the electronic devices 1000 (e.g., a set of one or more server devices where the software 1028 represents the software to implement the network security path identification and validation service); and 3) in operation, the electronic devices implementing the clients and the network security path identification and validation service would be communicatively coupled (e.g., by a network) and would establish between them (or through one or more other layers and/or or other services) connections for submitting data related to a multi-nodal network, an NACL, an ACG, classification features of nodes or edges of the ACG, and/or one or more rules to the network security path identification and validation service and returning compliance output to the clients. Other configurations of electronic devices may be used in other implementations (e.g., an implementation in which the client and the network security path identification and validation service are implemented on a single one of electronic device 1000).

During operation, an instance of the software 1028 (illustrated as instance 1006 and referred to as a software instance; and in the more specific case of an application, as an application instance) is executed. In electronic devices that use compute virtualization, the set of one or more processor(s) 1022 typically execute software to instantiate a virtualization layer 1008 and one or more software container(s) 1004A-304R (e.g., with operating system-level virtualization, the virtualization layer 1008 may represent a container engine (such as Docker Engine by Docker, Inc. or rkt in Container Linux by Red Hat, Inc.) running on top of (or integrated into) an operating system, and it allows for the creation of multiple software containers 1004A-304R (representing separate user space instances and also called virtualization engines, virtual private servers, or jails) that may each be used to execute a set of one or more applications; with full virtualization, the virtualization layer 1008 represents a hypervisor (sometimes referred to as a virtual machine monitor (VMM)) or a hypervisor executing on top of a host operating system, and the software containers 1004A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1028 is executed within the software container 1004A on the virtualization layer 1008. In electronic devices where compute virtualization is not used, the instance 1006 on top of a host operating system is executed on the "bare metal" electronic device 1000. The instantiation of the instance 1006, as well as the virtualization layer 1008 and software containers 1004A-304R if implemented, are collectively referred to as software instance(s) 1002.

Alternative implementations of an electronic device may have numerous variations from that described above. For example, customized hardware and/or accelerators might also be used in an electronic device.

Example Environment

Figure 10B:
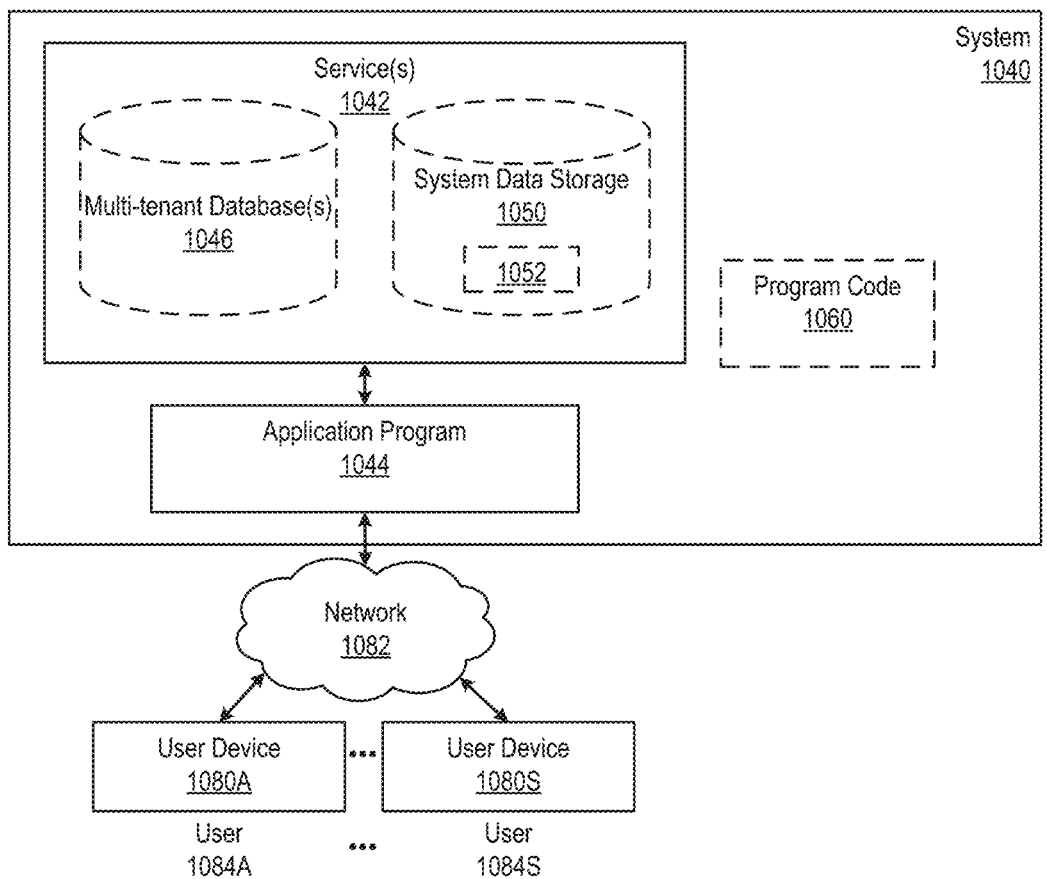
FIG. 10B is a block diagram of a deployment environment according to some example implementations.

FIG. 10B is a block diagram of a deployment environment according to some example implementations. A system 1040 includes hardware (e.g., a set of one or more server devices) and software to provide service(s) 1042, including the network security path identification and validation service. In some implementations the system 1040 is in one or more datacenter(s). These datacenter(s) may be: 1) first party datacenter(s), which are datacenter(s) owned and/or operated by the same entity that provides and/or operates some or all of the software that provides the service(s) 1042; and/or 2) third-party datacenter(s), which are datacenter(s)

owned and/or operated by one or more different entities than the entity that provides the service(s) 1042 (e.g., the different entities may host some or all of the software provided and/or operated by the entity that provides the service(s) 1042). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 1040 is coupled to user devices 1080A-380S over a network 1082. The service(s) 1042 may be on-demand services that are made available to one or more of the users 1084A-384S working for one or more entities other than the entity which owns and/or operates the on-demand services (those users sometimes referred to as outside users) so that those entities need not be concerned with building and/or maintaining a system, but instead may make use of the service(s) 1042 when needed (e.g., when needed by the users 1084A-384S). The service(s) 1042 may communicate with each other and/or with one or more of the user devices 1080A-380S via one or more APIs (e.g., a REST API). In some implementations, the user devices 1080A-380S are operated by users 1084A-384S, and each may be operated as a client device and/or a server device. In some implementations, one or more of the user devices 1080A-380S are separate ones of the electronic device 1000 or include one or more features of the electronic device 1000.

In some implementations, the system 1040 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 1040 is a multi-tenant cloud computing architecture supporting multiple services, such as one or more of the following types of services: Network security path identification and validation 1042; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 1040 may include an application platform 1044 that enables PAAS for creating, managing, and executing one or more applications developed by the provider of the application platform 1044, users accessing the system 1040 via one or more of user devices 1080A-380S, or third-party application developers accessing the system 1040 via one or more of user devices 1080A-380S.

In some implementations, one or more of the service(s) 1042 may use one or more multi-tenant databases 1046, as well as system data storage 1050 for system data 1052 accessible to system 1040. In certain implementations, the system 1040 includes a set of one or more servers that are running on server electronic devices and that are configured to handle requests for any authorized user associated with any tenant (there is no server affinity for a user and/or tenant to a specific server). The user devices 1080A-380S communicate with the server(s) of system 1040 to request and update tenant-level data and system-level data hosted by system 1040, and in response the system 1040 (e.g., one or more servers in system 1040) automatically may generate one or more Structured Query Language (SQL) statements (e.g., one or more SQL queries) that are designed to access the desired information from the multi-tenant database(s) 1046 and/or system data storage 1050.

In some implementations, the service(s) 1042 are implemented using virtual applications dynamically created at run time responsive to queries from the user devices 1080A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1060 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1044 includes an application setup mechanism that supports application developers' creation and management of applications, which may be saved as metadata by save routines. Invocations to such applications, including the network security path identification and validation service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1082 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 1040 and the user devices 1080A-380S.

Each user device 1080A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1040. For example, the user interface device can be used to access data and applications hosted by system 1040, and to perform searches on stored data, and otherwise allow one or more of users 1084A-384S to interact with various GUI pages that may be presented to the one or more of users 1084A-384S. User devices 1080A-380S might communicate with system 1040 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 1080A-380S might include an HTTP client, commonly referred to as a "browser," for sending and receiving HTTP messages to and from server(s) of system 1040, thus allowing users 1084A-384S of the user devices 1080A-380S to access, process and view information, pages and applications available to it from system 1040 over network 1082.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A non-transitory machine-readable storage medium that provides instructions that, if executed by a set of one or more processors, are configurable to cause said set of one or more processors to perform operations comprising:
   generating, based on node-related classification features of respective nodes of a plurality of nodes of a network and edge-related classification features of respective communicative couplings of a plurality of communicative couplings between respective nodes of the network, an access control graph (ACG) that relates to the network;
   identifying, based on the ACG, one or more paths between a first node of the plurality of nodes and a second node of the plurality of nodes, wherein a path of the one or more paths includes one or more communicative couplings between the first node and the second node;
identifying whether respective paths of the one or more paths comply with a pre-defined security policy set related to the network, the identifying including comparing respective classifications of respective communicative couplings of the path with a class specified by the pre-defined security policy set; and
outputting an indication of compliance of the one or more paths.

2. The non-transitory machine-readable storage medium of claim 1, wherein the ACG is a model of a network access control list (NACL) related to the network.

3. The non-transitory machine-readable storage medium of claim 2, wherein identifying the one or more paths is based on identifying communication flows allowed by the NACL between the first node and the second node.

4. The non-transitory machine-readable storage medium of claim 1, wherein the path of the one or more paths includes a third node communicatively coupled with the first node and the second node.

5. The non-transitory machine-readable storage medium of claim 1, wherein identifying the one or more paths is based on a shortest-path algorithm and a depth-first search algorithm.

6. The non-transitory machine-readable storage medium of claim 5, wherein the shortest-path algorithm is a Dijkstra algorithm or a Bellman-Ford algorithm.

7. The non-transitory machine-readable storage medium of claim 5, wherein the depth-first algorithm is applied subsequent to the application of the shortest-path algorithm.

8. The non-transitory machine-readable storage medium of claim 1, wherein the edge-related classification feature is a feature related to one or more of: an authentication-related feature, an authorization-related feature, and an encryption-related feature.

9. The non-transitory machine-readable storage medium of claim 1, wherein the node-related classification feature is a feature related to an internet protocol (IP) address of a node of the network.

10. The non-transitory machine-readable storage medium of claim 1, wherein identifying whether the path complies with the pre-defined security policy set includes comparing respective classifications of respective nodes of the path with classes specified by the pre-defined security policy set.

11. The non-transitory machine-readable storage medium of claim 1, wherein a communicative coupling between two nodes of the plurality of nodes is an edge of the ACG.

12. An apparatus comprising:
a set of one or more processors;
a non-transitory machine-readable storage medium that provides instructions that, if executed by the set of one or more processors, are configurable to cause the apparatus to perform operations comprising,
generating, based on node-related classification features of respective nodes of a plurality of nodes of a network and edge-related classification features of respective communicative couplings of a plurality of communicative couplings between respective nodes of the network, an access control graph (ACG) that relates to the network;
identifying, based on the ACG, one or more paths between a first node of the plurality of nodes and a second node of the plurality of nodes, wherein a path of the one or more paths includes one or more communicative couplings between the first node and the second node;
identifying whether respective paths of the one or more paths comply with a pre-defined security policy set related to the network, the identifying including comparing the pre-defined security policy set with edge-related classification features of communicative couplings in the path; and
outputting an indication of compliance of the one or more paths.

13. The apparatus of claim 12, wherein the edge-related classification feature is a feature related to one or more of: an authentication-related feature, an authorization-related feature, and an encryption-related feature.

14. The apparatus of claim 12, wherein the node-related classification feature is a feature related to an internet protocol (IP) address of a node of the network.

15. The apparatus of claim 12, wherein identifying whether the path complies with the pre-defined security policy set includes comparing the pre-defined security policy set with the node-related classification features of nodes in the path.

16. The apparatus of claim 12, wherein the ACG is a model of a network access control list (NACL) related to the network, and wherein a communicative coupling between two nodes of the plurality of nodes is an edge of the ACG.

17. A method comprising:
generating, based on node-related classification features of respective nodes of a plurality of nodes of a network and edge-related classification features of respective communicative couplings of a plurality of communicative couplings between respective nodes of the network, an access control graph (ACG) that relates to the network;
identifying, based on the ACG, one or more paths between a first node of the plurality of nodes and a second node of the plurality of nodes, wherein a path of the one or more paths includes one or more communicative couplings between the first node and the second node;
identifying whether respective paths of the one or more paths comply with a pre-defined security policy set related to the network, the identifying including comparing the pre-defined security policy set with edge-related classification features of communicative couplings in the path; and
outputting an indication of compliance of the one or more paths.

18. The method of claim 17, wherein the edge-related classification feature related to one or more of: an authentication-related feature, an authorization-related feature, and an encryption-related feature.

19. The method of claim 17, wherein the node-related classification feature is a feature based on an internet protocol (IP) address of a node of the network.

20. The method of claim 17, wherein identifying whether the path complies with the pre-defined security policy set includes comparing the pre-defined security policy set with the node-related classification features of nodes in the path.

21. The method of claim 17, wherein the ACG is a model of a network access control list (NACL) related to the network, and wherein a communicative coupling between two nodes of the plurality of nodes is an edge of the ACG.

* * * * *